United States Patent
Marti et al.

(10) Patent No.: US 8,903,414 B2
(45) Date of Patent: *Dec. 2, 2014

(54) LOCATION ESTIMATION USING A PROBABILITY DENSITY FUNCTION

(75) Inventors: Lukas M. Marti, Santa Clara, CA (US); Glenn Donald MacGougan, San Jose, CA (US); Robert Mayor, Half Moon Bay, CA (US); Ronald K. Huang, San Jose, CA (US); Jason Dere, San Jose, CA (US); Yefim Grosman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 755 days.

This patent is subject to a terminal disclaimer.

(21) Appl. No.: 13/153,069

(22) Filed: Jun. 3, 2011

(65) Prior Publication Data

US 2012/0309428 A1 Dec. 6, 2012

(51) Int. Cl.
*H04M 11/04* (2006.01)
*H04M 3/42* (2006.01)
*H04W 24/00* (2009.01)
*G01S 5/02* (2010.01)
*H04W 64/00* (2009.01)

(52) U.S. Cl.
CPC .......... *G01S 5/0278* (2013.01); *H04W 64/003* (2013.01)
USPC .................. 455/456.1; 455/404.2; 455/414.1

(58) Field of Classification Search
CPC ... G01S 5/0278; H04W 64/00; H04W 64/003
USPC .................... 455/404.1, 404.2, 414.1, 456.1; 342/357.43, 357.66, 450
See application file for complete search history.

(56) References Cited

U.S. PATENT DOCUMENTS

| | | | |
|---|---|---|---|
| 6,961,562 B2 | 11/2005 | Ross | |
| 7,236,091 B2* | 6/2007 | Kiang et al. | 340/539.1 |
| 7,319,878 B2* | 1/2008 | Sheynblat et al. | 455/456.3 |
| 7,764,231 B1* | 7/2010 | Karr et al. | 342/457 |
| 8,098,590 B2* | 1/2012 | Catovic et al. | 370/252 |
| 8,311,018 B2* | 11/2012 | Carlson et al. | 370/336 |
| 8,391,889 B2 | 3/2013 | Marti et al. | |
| 8,483,719 B2* | 7/2013 | Eitan et al. | 455/456.5 |
| 8,600,297 B2* | 12/2013 | Ketchum et al. | 455/13.2 |
| 2005/0130672 A1* | 6/2005 | Dean et al. | 455/456.1 |
| 2006/0009235 A1* | 1/2006 | Sheynblat et al. | 455/456.1 |

(Continued)

OTHER PUBLICATIONS

Edge, WO 2007/056738, "Positioning for WLANs and other wireless networks", Aug. 30 2007.*

*Primary Examiner* — Wesley Kim
(74) *Attorney, Agent, or Firm* — Fish & Richardson P.C.

(57) ABSTRACT

Methods, program products, and systems of location estimation using a probability density function are disclosed. In general, in one aspect, a server can estimate an effective location of a wireless access gateway using harvested data. The server can harvest location data from multiple mobile devices. The harvested data can include a location of each mobile device and an identifier of a wireless access gateway that is located within a communication range of the mobile device. The server can calculate an effective location of the wireless access gateway using a probability density function of the harvested data. The probability density function can be a sufficient statistic of the received set of location coordinates for calculating an effective location of the wireless access gateway. The server can send the effective location of the wireless access gateway to other mobile devices for estimating locations of the other mobile devices.

33 Claims, 13 Drawing Sheets

(56) References Cited

U.S. PATENT DOCUMENTS

| | | | |
|---|---|---|---|
| 2007/0002813 A1* | 1/2007 | Tenny et al. | 370/338 |
| 2008/0019317 A1 | 1/2008 | Vellanki et al. | |
| 2008/0123608 A1* | 5/2008 | Edge et al. | 370/338 |
| 2008/0227462 A1* | 9/2008 | Freyman et al. | 455/456.1 |
| 2009/0280829 A1* | 11/2009 | Feuerstein | 455/456.1 |
| 2009/0310501 A1* | 12/2009 | Catovic et al. | 370/252 |
| 2010/0056185 A1* | 3/2010 | Lamba | 455/456.6 |
| 2010/0156706 A1* | 6/2010 | Farmer et al. | 342/357.1 |
| 2010/0159885 A1* | 6/2010 | Selgert et al. | 455/412.1 |
| 2010/0159949 A1* | 6/2010 | Selgert et al. | 455/456.1 |
| 2010/0183134 A1 | 7/2010 | Vendrow et al. | |
| 2010/0210285 A1* | 8/2010 | Pande et al. | 455/456.1 |
| 2010/0240339 A1 | 9/2010 | Diamond | |
| 2010/0240397 A1* | 9/2010 | Buchmayer et al. | 455/456.1 |
| 2012/0002563 A1* | 1/2012 | Flanagan | 370/252 |
| 2013/0178230 A1 | 7/2013 | Marti et al. | |
| 2013/0288709 A1* | 10/2013 | Flanagan | 455/456.1 |

* cited by examiner

LOCATION ESTIMATION USING A PROBABILITY DENSITY FUNCTION

TECHNICAL FIELD

This disclosure relates generally to geographic location determination.

BACKGROUND

A wireless communications network can employ various technologies for mobile devices to communicate wirelessly. The wireless communications network can include one or more wireless access gateways for connecting a mobile device to another mobile device or to a wired network. The wireless access gateways can include, for example, cell towers or wireless access points (APs) of a wireless local area network (WLAN) or a metropolitan area network (MAN). Each of the wireless access gateways can serve mobile devices located in a geographic area (e.g., a cell of a cellular network).

A mobile device can include one or more location-based applications that are configured to perform location-specific tasks. A mobile device equipped with global positioning system (e.g., GPS) functions can use a location determined by the global positioning system as an input to a location-based application. A mobile device not equipped with global positioning system functions, or a mobile device located in an area where GPS signals are weak (e.g., inside buildings), can use alternative ways to determine a location. For example, if the location of a wireless access gateway is known, and a mobile device is connected to the wireless access gateway, the mobile device can estimate a current location using a location of the connected wireless access gateway based on a signal strength.

SUMMARY

Methods, program products, and systems of location estimation using a probability density function are disclosed. In general, in one aspect, a server can estimate an effective location of a wireless access gateway using harvested data. The server can harvest location data from multiple mobile devices. The harvested data can include a location of each mobile device and an identifier of a wireless access gateway that is located within a communication range of the mobile device. The server can calculate an effective location of the wireless access gateway using a probability density function of the harvested data. The probability density function can be a sufficient statistic of the received set of location coordinates for calculating an effective location of the wireless access gateway. The server can send the effective location of the wireless access gateway to other mobile devices for estimating locations of the other mobile devices.

In some implementations, a server can harvest location data from multiple mobile devices. The harvested data can include a location of a mobile device and an identifier of a wireless access gateway that is located within a communication range of the mobile device. The location of the mobile device can include an altitude coordinate of the mobile device. Based on the harvested data, the server can determine an effective altitude of the wireless access gateway using statistical analysis. The server can send the effective altitude of the wireless access gateway to other mobile devices for estimating altitudes of the other mobile devices.

The techniques of estimating location using a probability density function can be implemented to achieve the following advantages. The locations of wireless access gateways can be used as a supplement to GPS location estimation. A server can send a collection of locations of wireless access gateways to a mobile device. When the mobile device is not equipped with GPS functions, the mobile device can use the locations of wireless access gateways to determine a current location. For a mobile device equipped with GPS functions, the location estimation can be used to supplement the GPS functions when the GPS signals are weak. In addition, GPS signal acquisition time can be improved over a conventional mobile device. The mobile device can estimate a location using the locations of wireless access gateways to assist in determining to which GPS satellite to connect, thereby reducing the number of channels to scan.

Location estimation of a wireless access gateway can be more accurate compared to conventional location determinations. The more accurate location estimate, in turn, can be a better basis for estimating a current location of a mobile device. Location estimation of a wireless access gateway using a probability density function does not require multiple iterations in the calculation. Accordingly, location estimation of a wireless access gateway using a probability density function can be performed faster than a conventional location determination. The probability density function can be a sufficient statistic of harvested data with respect to calculating a location. Accordingly, the calculation can be performed using approximately the same amount of memory regardless of the amount of data processed.

The estimated location of a wireless access gateway can include an altitude. Thus, a mobile device can determine a current location in a three-dimensional space. The three-dimensional location information can be useful, for example, in determining on which floor of a high-rise building the mobile device is located. The altitude can supplement latitude and longitude coordinates. Accordingly, for example, an altitude profile can be created for a street or a park.

The details of one or more implementations of estimating location using a probability density function are set forth in the accompanying drawings and the description below. Other features, aspects, and advantages of estimating location using a probability density function will become apparent from the description, the drawings, and the claims.

BRIEF DESCRIPTION OF THE DRAWINGS

Like reference symbols in the various drawings indicate like elements.

DETAILED DESCRIPTION

Overview of Location Estimation Using a Probability Density Function

Figure 1:
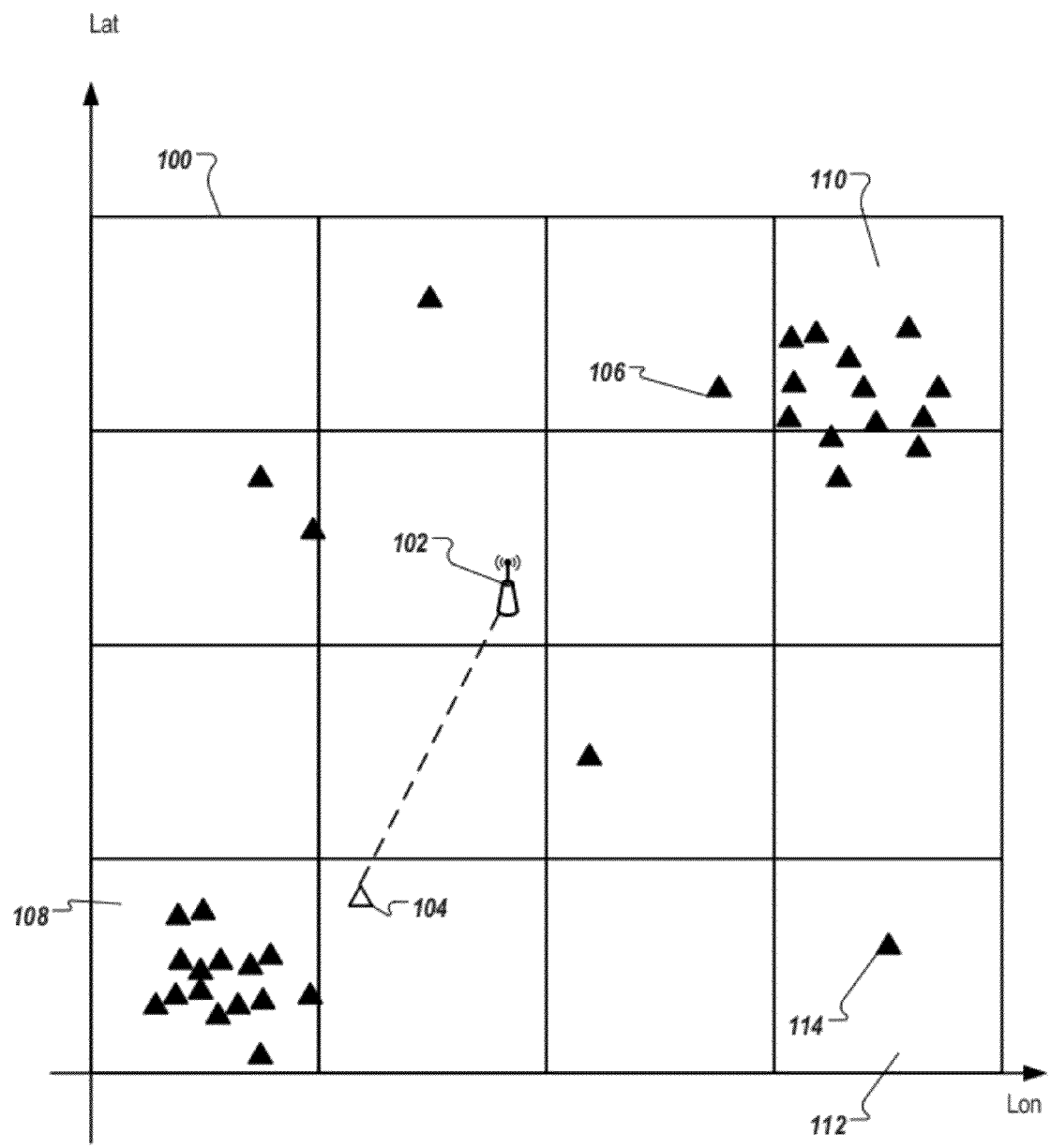
FIG. 1 is a diagram providing an overview of exemplary techniques of location estimation using a probability density function.

FIG. 1 is a diagram providing an overview of exemplary techniques of location estimation using a probability density function. A system performing location estimation can apply a probability density function on data of location points distributed on geographic grid 100 to estimate an effective location of wireless access gateway 102.

An effective location of wireless access gateway 102 is a calculated location of wireless access gateway 102 that can be used to calculate a location of mobile device 104 being located within a communication range of wireless access gateway 102. The effective location can indicate a likely location of mobile device 104. The effective location can include latitude, longitude, and altitude coordinates. The coordinates can be associated with an uncertainty value, which can indicate an accuracy of the coordinates. The effective location can, but often does not, coincide with a physical location of wireless access gateway 102.

The system can harvest data from multiple location-aware devices 106. Each of the location-aware devices 106 can be configured to transmit a current location to the system anonymously. The current location can include a detected latitude, longitude, and altitude of the location-aware devices 106. The location can be associated with an identifier of wireless access gateway 102. The identifier can include, for example, a cell identifier of wireless access gateway 102 when wireless access gateway 102 is a cell tower, or a media access control (MAC) address when wireless access gateway 102 is a wireless access point or a Bluetooth™ device. The location can be associated with additional information relating to communication between a mobile device and wireless access gateway 102. The additional information can include, for example, a received signal strength indication (RSSI), bit error rate information, or both. A data point in the harvested data can include the location, the identifier, and the additional information. In FIG. 1, each triangle indicates a harvested data point.

The system can use grid 100 to identify geographic regions in which received locations of location-aware devices 106 are concentrated. Grid 100 can be a geographic area associated with wireless access gateway 102 that includes multiple tiles of geographic regions. Each tile can correspond to a bin into which the harvested data points can be put. Each bin is a unit in grid 100 for which a probability distribution can be calculated. Grid 100 can include multiple bins. The system can generate a histogram representing a distribution of the locations in the harvested data based on the bins of grid 100. The system can select one or more bins (e.g., bins 108 and 110) based on a probability density function. The probability density function can include a sufficient statistic of the received set of location coordinates for calculating an effective location of wireless access gateway 102. The sufficient statistic can include a representation of the harvested data that retains properties of the harvested data. The sufficient statistic can include a likelihood technique that allows the system to model how well the system performs on summarizing the location coordinates in the harvested data for calculating the location of wireless access gateway 102. The system can use the sufficient statistic to create a parameter that summarizes the characteristics of the harvested data.

The system can exclude one or more bins (e.g., bin 112) that includes locations considered outliers by the system. An outlier can be an improbable measurement unrepresentative of the harvested data. The system can identify outlier 114 by identifying a location that is statistically distant from other locations in the harvested data. When a bin is excluded, the system can ignore the data points in the bin when calculating an effective location of wireless access gateway 102.

The system can determine an effective location of wireless access gateway 102 based on sets of locations in the selected bins 108 and 110. The system can send the effective location and effective locations of other wireless access gateways to mobile device 104 for determining a location of mobile device 104.

Figure 2:
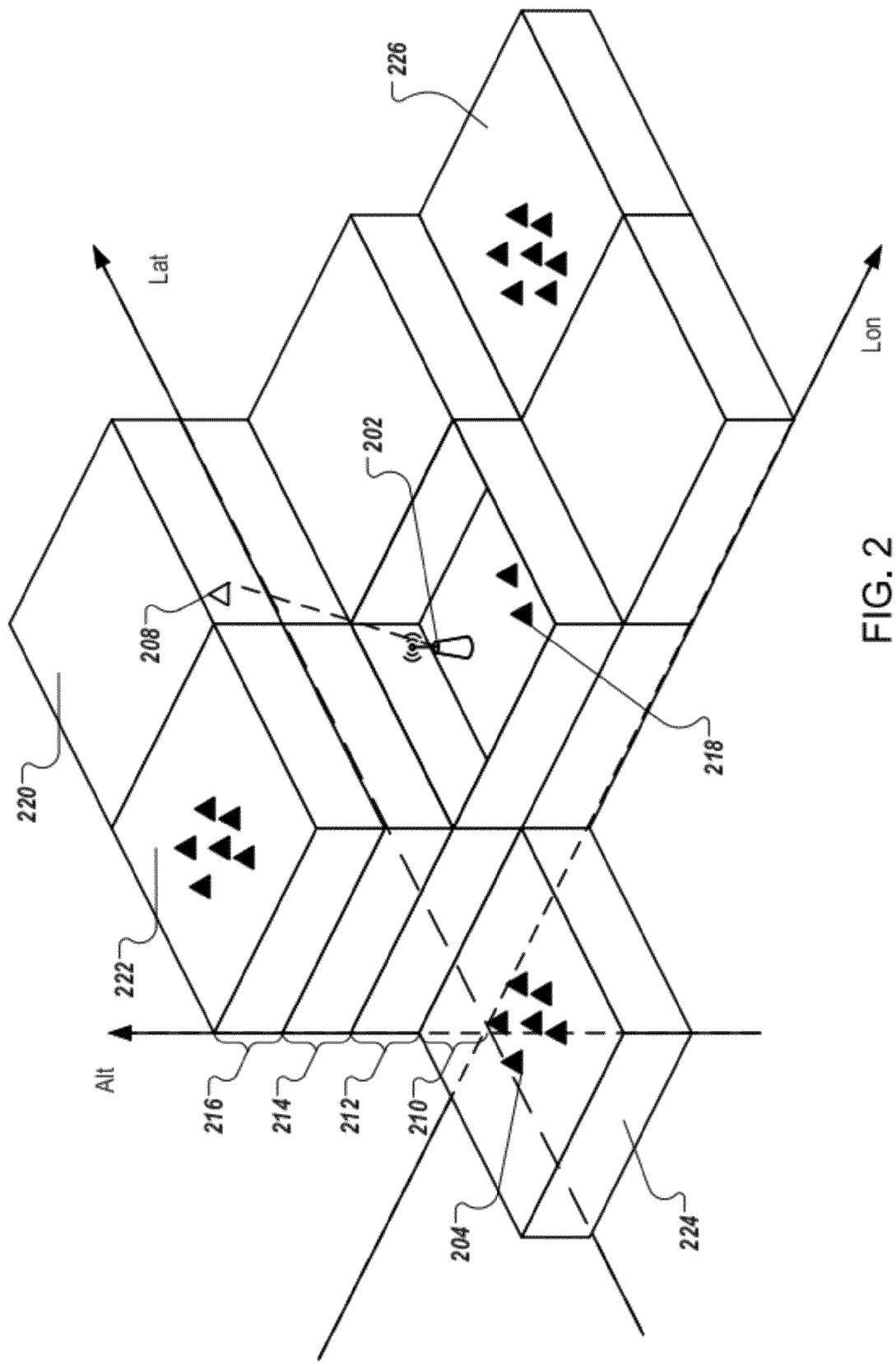
FIG. 2 is a diagram providing an overview of exemplary techniques of location estimation using a probability density function in a three-dimensional space.

FIG. 2 is a diagram providing an overview of exemplary techniques of location estimation using a probability density function in a three-dimensional space. A system can determine an effective altitude of wireless access gateway 202 using location data harvested from one or more mobile devices 204. The effective altitude of wireless access gateway 202 is a calculated altitude of wireless access gateway 202 that can be used to calculate an altitude of mobile device 208 that is located within communication range of wireless access gateway 202. The effective altitude can indicate a likely altitude where mobile device 208 is located. The effective altitude can be, but often is not, an actual altitude of wireless access gateway 202.

The system can create virtual layers 210, 212, 214, and 216. Each virtual layer can correspond to an altitude segment along a Z (altitude) axis in a three-dimensional space. Each altitude segment can have a specified height (e.g., 10 meters). The system can generate a histogram representing a distribution of the locations in the harvested data based on virtual layers 210, 212, 214, and 216. The system can select one or more layers (e.g., layers 210 and 216) based on a probability density function. The probability density function can include a sufficient statistic of the received set of location coordinates for calculating an effective altitude of wireless access gateway 202.

The system can exclude one or more layers (e.g., layer 212) that include one or more outliers. The system can identify outlier 218 by identifying an altitude that is statistically distant from other altitudes in the harvested data.

The system can determine an effective altitude of wireless access gateway 202 based on sets of altitudes in the selected layers 210 and 216. The system can send the effective altitude and effective altitudes of other wireless access gateways to mobile device 208 for determining an altitude of mobile device 208.

In some implementations, the system can determine an effective location of wireless access gateway 202 in a three-dimensional space by using latitude, longitude, and altitude data. The system can create multiple blocks in the three-dimensional space. One of these blocks is exemplary block 220. Block 220 can be defined using one or more sets of latitude, longitude, and altitude coordinates that indicates a length, width, and height. The system can generate a histogram representing a distribution of three-dimensional locations in the harvested data based on the blocks. The system can calculate a probability distribution of harvest data points for each block. The system can select one or more blocks (e.g., blocks 722, 224, and 226) based on a probability density function. The probability density function can include a sufficient statistic of the received set of location coordinates for calculating an effective location of wireless access gateway 202 in the three-dimensional space. The system can calculate the effective location of wireless access gateway 202 in the three-dimensional space by using operations of selection and exclusion in a similar manner as described above with respect to the two-dimensional and altitude calculations.

Exemplary Probability Density Function Used in Location Estimation

Figure 3A:
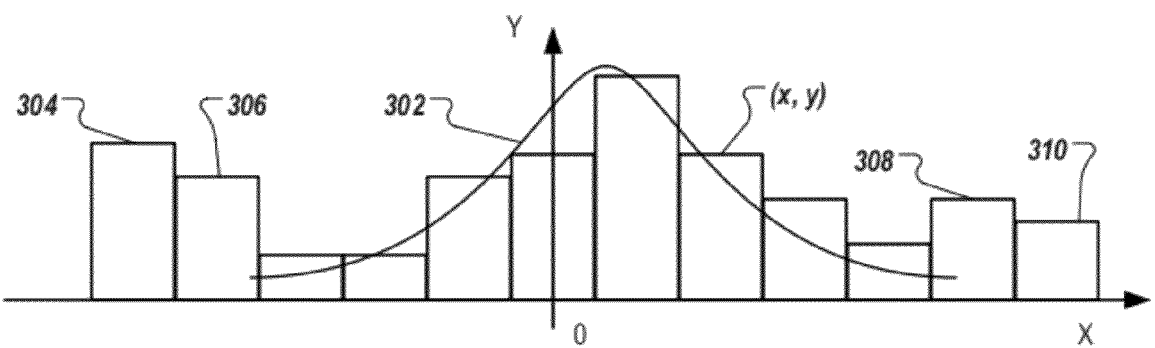
FIGS. 3A and 3B are illustrations of exemplary operations of applying a probability density function to exclude outliers in harvested data.
Figure 3B:
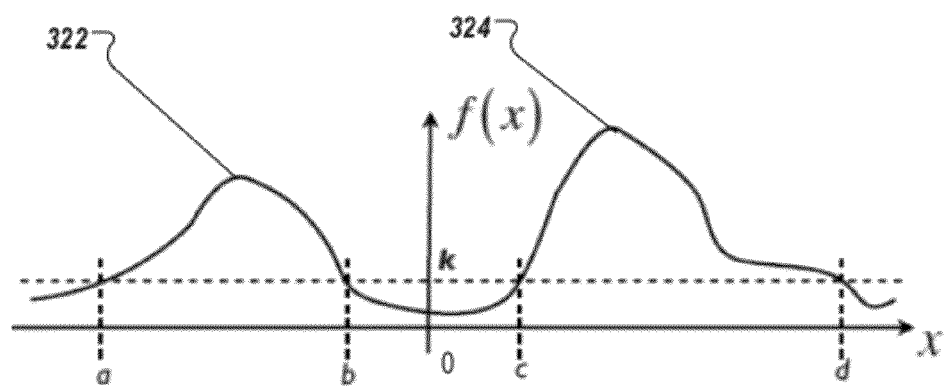

FIGS. 3A and 3B are illustrations exemplary operations of applying a probability function to exclude outliers in harvested data. FIG. 3A illustrates a conventional way of determining an effective location of a wireless access gateway physically located at location "0." The conventional way of determining the location can include, for example, determining the location based on signal strength and triangulation. The X axis in FIG. 3A can correspond to distance from the location. The Y axis in FIG. 3A can correspond to a number of data sampled from various mobile devices. A point (x, y) in FIG. 3A can indicate that based on data from y mobile devices, the location of the wireless access gateway is approximately x units from the y mobile devices.

The system utilizing the conventional technologies can determine a unimodal probability distribution 302 for calculating a location of the wireless access gateway. If the actual data distribution is not unimodal, the conventional system can produce suboptimal calculations. For example, information on data 304, 306, 308, and 310 indicating concentration far away from the average can be lost in the calculations.

FIG. 3B is a diagram illustrating calculations performed in estimating a location using a probability density function in one dimension. The X axis in FIG. 3B can correspond to distance from the location of a wireless access gateway physically located at location "0". The Y axis in FIG. 3B can correspond to a probability distribution f(x) indicating the probability that a location coordinate in harvested data is at distance x to the location. The probability distribution f(x) can have the following property:

$$\int_{-\infty}^{\infty} f(x)\,dx = 1 \quad (1)$$

The probability distribution can be multi-modal. For example, f(x) can have local maxima 322 and 324, which will be referred to as modes of f(x).

The system can determine a measurement for selecting one or more regions (e.g., regions [a, b] and [c, d]) such that an expected value in the selected region satisfies an outlier threshold. For example, the system can determine the measurement k using the following formula:

$$\int_a^b p(x)\,dx + \int_c^d p(x)\,dx = 1 - OutlierThreshold \quad (2)$$

where $$a,b,c,d = f^{-1}(k) \quad (3)$$

In (2) and (3), a, b, c, d can define regions. P(x) can indicate a likelihood, according to harvested data, that a location coordinate is located at distance x from an effective location. The OutlierThreshold is a threshold value below which a location coordinate in harvest data is regarded an improbable measurement and not representative of the harvested data. In some implementations, the system can solve k using Newton's Method. In some implementations, the system can sort harvested data and perform the integration until the OutlierThreshold is satisfied.

The calculations are shown in a one-dimensional example. In some implementations, the regions and corresponding calculations can correspond to a two-dimensional or three-dimensional space. For example, in some implementations, the regions can correspond to the one-dimensional altitude segments (as described in reference to FIG. 2), two-dimensional tiles (as described in reference to FIG. 1), or three-dimensional blocks (as described in reference to FIG. 2). Accordingly, calculations can be multi-variable calculations. Each altitude segment, tile, and block can be associated with a bin.

In a two-dimensional space, the system can determine a k-th moment of the probability distribution based on the following formulae:

$$E[X^k] = \int_{-\infty}^{\infty}\int_{-\infty}^{\infty} x^k f(x,y)\,dy\,dx \quad (4)$$

$$E[Y^k] = \int_{-\infty}^{\infty}\int_{-\infty}^{\infty} y^k f(x,y)\,dx\,dy$$

The system can determine expected effective location based on the following formulae:

$$E[X] = \int_{-\infty}^{\infty}\int_{-\infty}^{\infty} xf(x,y)\,dy\,dx \quad (5)$$

$$E[Y] = \int_{-\infty}^{\infty}\int_{-\infty}^{\infty} yf(x,y)\,dx\,dy$$

Accordingly, the system can determine the standard deviation of the effective location using the following formulae:

$$E[X^2] - E[X]^2 = \quad (6)$$

$$\sqrt{\int_{-\infty}^{\infty}\int_{-\infty}^{\infty} x^2 f(x,y)\,dy\,dx - (\int_{-\infty}^{\infty}\int_{-\infty}^{\infty} xf(x,y)\,dy\,dx)^2}$$

$$E[Y^2] - E[Y]^2 =$$

$$\sqrt{\int_{-\infty}^{\infty}\int_{-\infty}^{\infty} y^2 f(x,y)\,dx\,dy - (\int_{-\infty}^{\infty}\int_{-\infty}^{\infty} y^2 f(x,y)\,dx\,dy)^2}$$

Figure 4A:
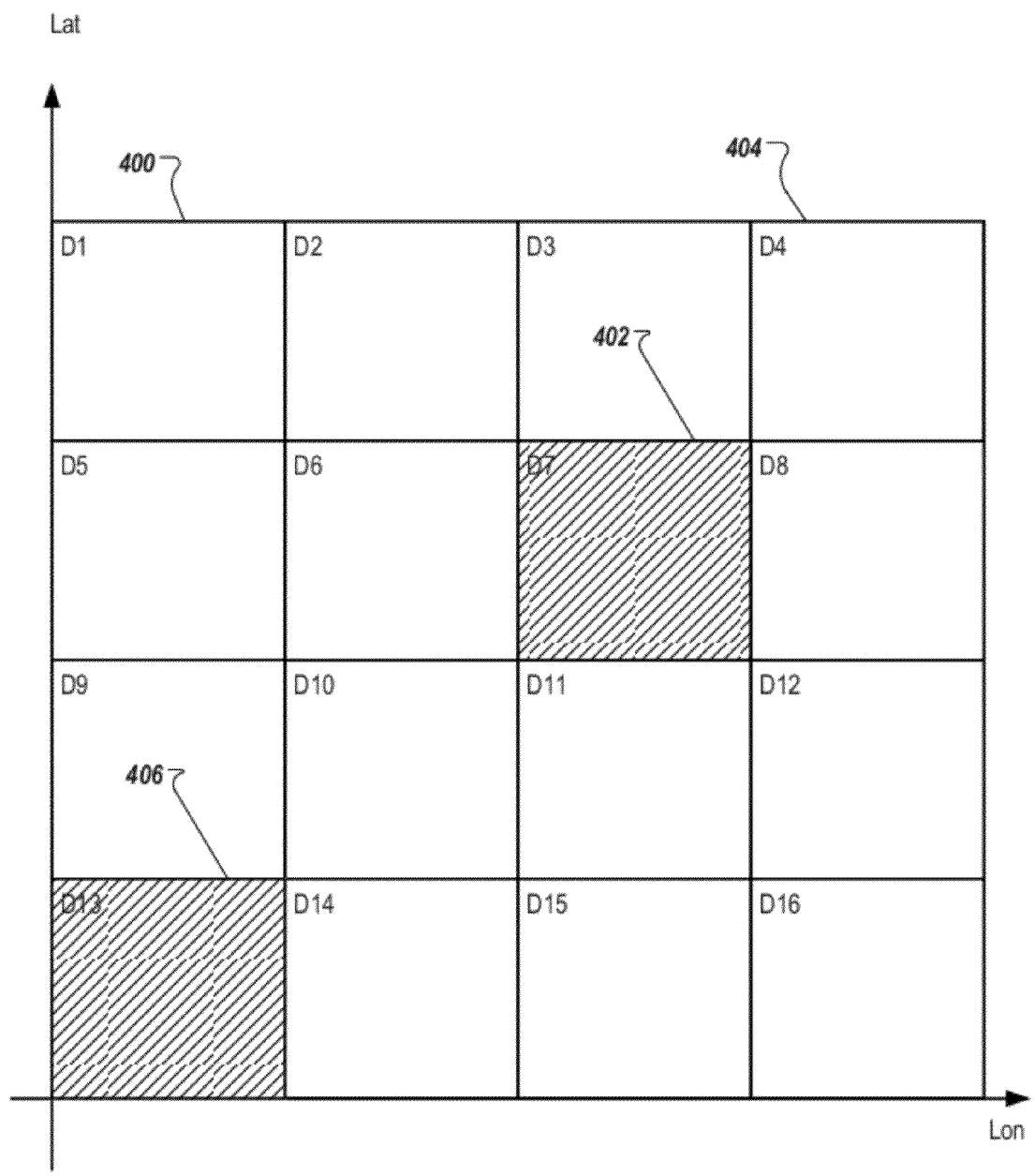
FIG. 4A is a top plan view of an exemplary three-dimensional histogram plot used in location estimation.

FIG. 4A is a top plan view of an exemplary three-dimensional histogram plot 400 used in location estimation (hereafter referred to as "histogram 400"). Histogram 400 is implemented in a two-dimensional space defined by a latitude and a longitude. Other dimensions can be implemented similar manner. Histogram 400 can be associated with a wireless access gateway.

Histogram 400 can be defined using a minimum latitude, a minimum longitude, a maximum latitude, and a maximum longitude. Size of histogram 400 can be determined based on technology used by the wireless access gateway. For example, a histogram corresponding to a cell tower can be larger than one that corresponds to a wireless access point in terms of differences between the latitudes and between the longitudes.

The size of memory used in storing a larger histogram and the size of memory used in storing a smaller histogram can be the same.

Histogram 400 can correspond to a data structure that includes components as listed in Table 1 below.

TABLE 1

Histogram Data Structure

| DATA | DESCRIPTION |
| --- | --- |
| Device ID | An identifier of the wireless access gateway |
| Dimension | Latitude/longitude coordinates |
| Width/height | Counts of number of bins in longitude/latitude dimensions respectively |
| Minimum/maximum TOM | Minimum and maximum time of movement. Will be described in further detail below in reference to FIG. 5 |
| Number of data points | Number of harvested data points in the histogram |
| Bins | A list or array of bins in the histogram |
| Minimum/maximum coordinates | Minimum and maximum latitude, longitude, and altitude |

Histogram 400 can include multiple bins (e.g., bins 402, 404, and 406). Some of the bins (e.g., bins 402 and 406, as represented by shaded boxes in FIG. 4) can be bins selected according to the operations as described above in reference to FIG. 3B. Each of the bins can be associated with a count of data point (e.g., values D1 through D16 as shown in FIG. 4A). Each of the bins can correspond to a data structure that includes components as listed in Table 2 below.

TABLE 2

Bin Data Structure

| DATA | DESCRIPTION |
| --- | --- |
| Dimension | Latitude/longitude coordinates |
| Data points | A count of number of data points in the bin |
| Signal Quality | Minimum/maximum/average value of various measurements of signal quality of the data points (e.g., RSSI, round trip time, or bit error rate) |
| Minimum/maximum TOM | Minimum and maximum time of movement. Will be described in further detail below in reference to FIG. 5 |

The system can extract one or more wireless access gateway identifiers from harvested data, generate histogram 400 by creating the data structures for histogram 400 and the bins in histogram 400. The system can populate the data structures using the harvested data, and perform calculations based on the populated data structures. The data structures do not depend on the number of data points harvested. Accordingly, subsequent calculations using the a probability density function need not increase in complexity and processing time when more data points are harvested.

Figure 4B:
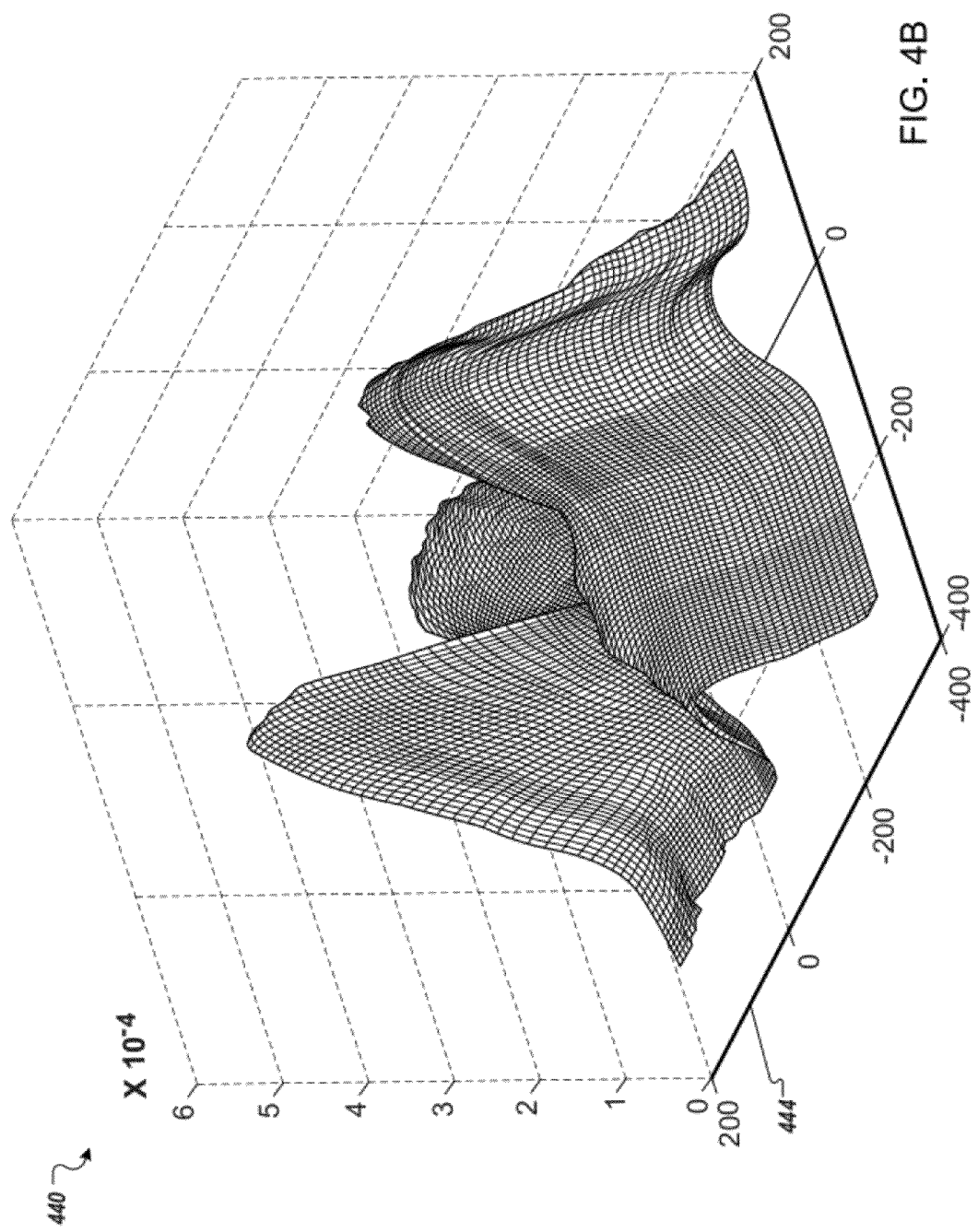
FIG. 4B is an exemplary histogram used in location estimation.

FIG. 4B is an exemplary histogram 440 used in location estimation. Histogram 440 can correspond to a sufficient statistic of harvested data for calculating an effective location based on harvested data points. The sufficient statistic is shown in reference to grid 444. Histogram 440 can be determined using one or more computers.

Filtering Harvested Data

Figure 5:
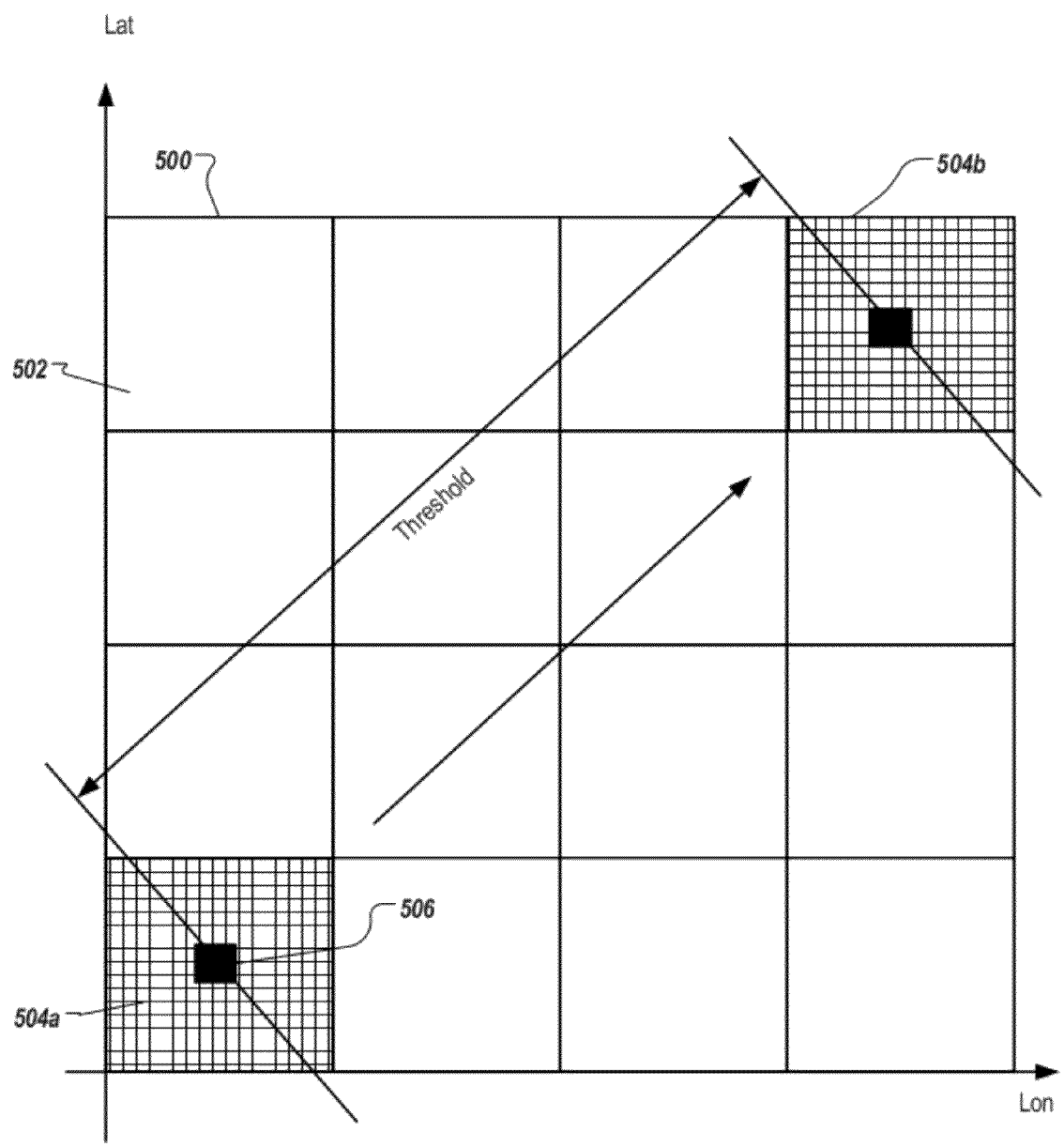
FIG. 5 is a diagram illustrating exemplary techniques of detecting moving wireless access gateways.

FIG. 5 is a diagram illustrating exemplary techniques of detecting moving wireless access gateways. A wireless access gateway can physically move. For example, a wireless access point can be taken from home to work in the morning and from work to home in the evening. A cell tower can change a corresponding cell identifier to one that originally corresponds to another cell tower a long distance away. Identifying moving wireless access gateways can reduce errors in location calculation.

A system can identify movement of a wireless access gateway based on a distance comparison. Map 500 can include multiple grids 502 that correspond to various wireless access gateways. Each grid can correspond to a wireless access gateway, and include multiple bins. Grid 504a can correspond to wireless access gateway 506. Grid 504a can have a data structure that includes minimum and maximum latitudes, longitudes, and altitudes. The system can determine that wireless access gateway 506 has moved when a distance span between two corresponding values in the grid satisfies a threshold. In some implementations, the system can determine a movement based on altitude when the following condition is satisfied:

$$\text{MaxAlt} - \text{MinAlt} > \text{AltThreshold} \tag{7}$$

where MaxAlt is a maximum altitude in harvested data in a grid, MinAlt is a minimum altitude in the harvested data in the grid, and AltThreshold is a specified threshold in altitude.

In some implementations, the system can determine a movement based on latitudes and longitudes when the following condition is satisfied:

$$a(\text{MaxLat} - \text{MinLat})^2 + b(\text{MaxLon} - \text{MinLon})^2 > \text{LatLonThreshold}^2 \tag{8}$$

where MaxLat is a maximum altitude in harvested data in a grid, MinLat is a minimum latitude in the harvested data in the grid, MaxLon is a maximum longitude in harvested data in a grid, MinLon is a minimum longitude in the harvested data in the grid, and AltThreshold is a specified threshold distance. The values a and b can be weights in the latitudes and longitudes. The default values of a and b can be 1. The values of a and b can differ as the latitude goes higher. For example, in high latitude areas, the difference between MaxLon and MinLon can have less weight than that of the difference between MaxLat and MinLat.

In some implementations, the system can determine a movement based on latitudes, longitudes, and altitudes when the following condition is satisfied:

$$a(\text{MaxLat} - \text{MinLat})^2$$
$$+ b(\text{MaxLon} - \text{MinLon})^2$$
$$+ c(\text{MaxAlt} - \text{MinAlt})^2 > \text{LatLonAltThreshold}^2 \tag{9}$$

where MaxAlt is a maximum altitude in harvested data in a grid, MinAlt is a minimum altitude in the harvested data in the grid, AltThreshold is a specified threshold in altitude, MaxLat is a maximum altitude in harvested data in a grid, MinLat is a minimum latitude in the harvested data in the grid, MaxLon is a maximum longitude in harvested data in a grid, MinLon is a minimum longitude in the harvested data in the grid, and AltThreshold is a specified threshold distance. The values a, b, and c can be weights in the latitudes, longitudes, and altitudes.

When the system determines that a wireless access gateway has moved, the system can select data points from the harvested data based on age distinctions. The system can determine a time after which a condition (7), (8), or (9) is satisfied and designate the determined time as a time of movement (TOM). The system can select data points having timestamps after the last TOM for location calculation, and ignore data points having timestamps before the last TOM. For example, before the time of movement, the data points for wireless access gateway 506 can correspond to grid 504a. After the time of movement, the data points for wireless access gateway 506 can correspond to grid 504b.

The system can determine whether wireless access gateway 506 was moving when data of wireless access gateway 506 were harvested. Wireless access gateway 506, if was moving (e.g., in a car driving by a mobile device gathering data) and was harvested by accident, can cause location estimation errors. Accordingly, the system can exclude wireless access gateway 506 from location calculations if wireless access gateway 506 is a moving gateway.

The system can determine movement of wireless access gateway 506 by storing a minimum time of movement and a maximum time of movement. The system can use the minimum time between movements and a maximum time of movement to filter out wireless access gateway 506. If the minimum time between the minimum time of movements and the maximum time of movement of wireless access gateway 506 satisfies a threshold (e.g., less than a threshold), the system can designate wireless access gateway 506 as a low value wireless access gateway, and excludes wireless access gateway 506 from location estimation.

Figure 6:
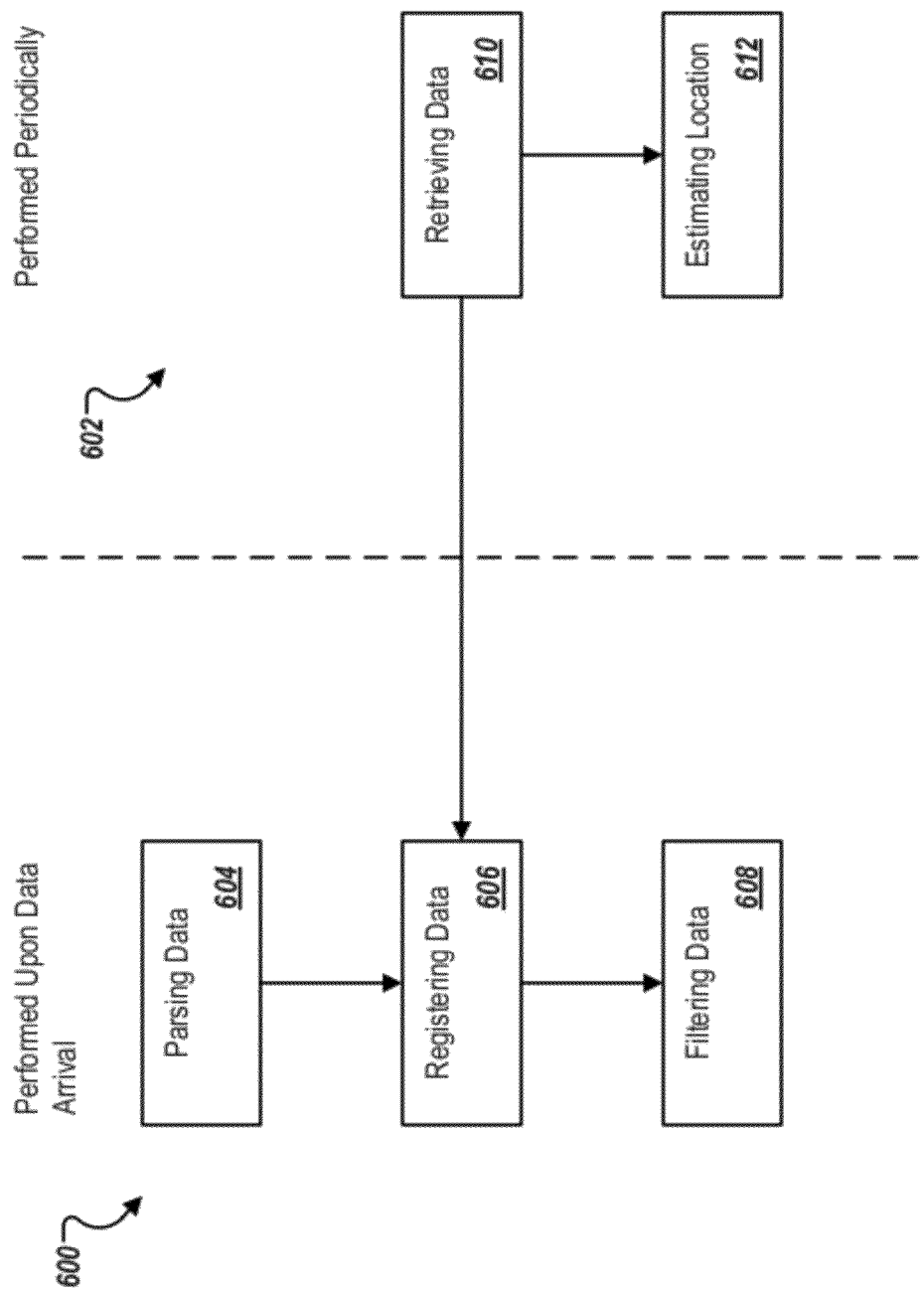
FIG. 6 is flowchart illustrating exemplary operations of data harvesting and location estimation.

FIG. 6 is flowchart illustrating exemplary operations of data harvesting and location estimation. The operations can include data harvesting operations 600 and location estimation operations 602. Data harvesting operations 600 can be performed continuously, for example, as a daemon. Data harvesting operations 600 can be performed upon data arrival. A system can parse (604) the data when the data arrive. Parsing the data can include identifying data fields for latitude, longitude, altitude, timestamp, wireless access gateway identifier, RSSI, or other information.

The system can register (606) the parsed data as harvested data. Registering the parsed data can include storing at least a portion of the parsed data in a data store. Registering the parsed data can include excluding some of the parsed data when the parsed data includes invalid information (e.g., an invalid wireless access gateway identifier).

The system can filter (608) the harvested data. Filtering the harvested data can include identifying stale data that the system will no longer use to estimate a location and discarding the identified stale data. The stale data can include location data corresponding to a wireless access gateway that has moved.

The system can perform location estimation operations 602 under a scheme that is independent from the data harvesting operations 600. For example, the system can perform location estimation operations 602 periodically (e.g., every two weeks) or upon request. The system can retrieve (610) the harvested data. The operations of retrieving harvested data can include interacting with operations of registering the data (operations 606). The system can estimate (612) a location of a wireless access gateway using retrieved data.

Exemplary System Components

Figure 7:
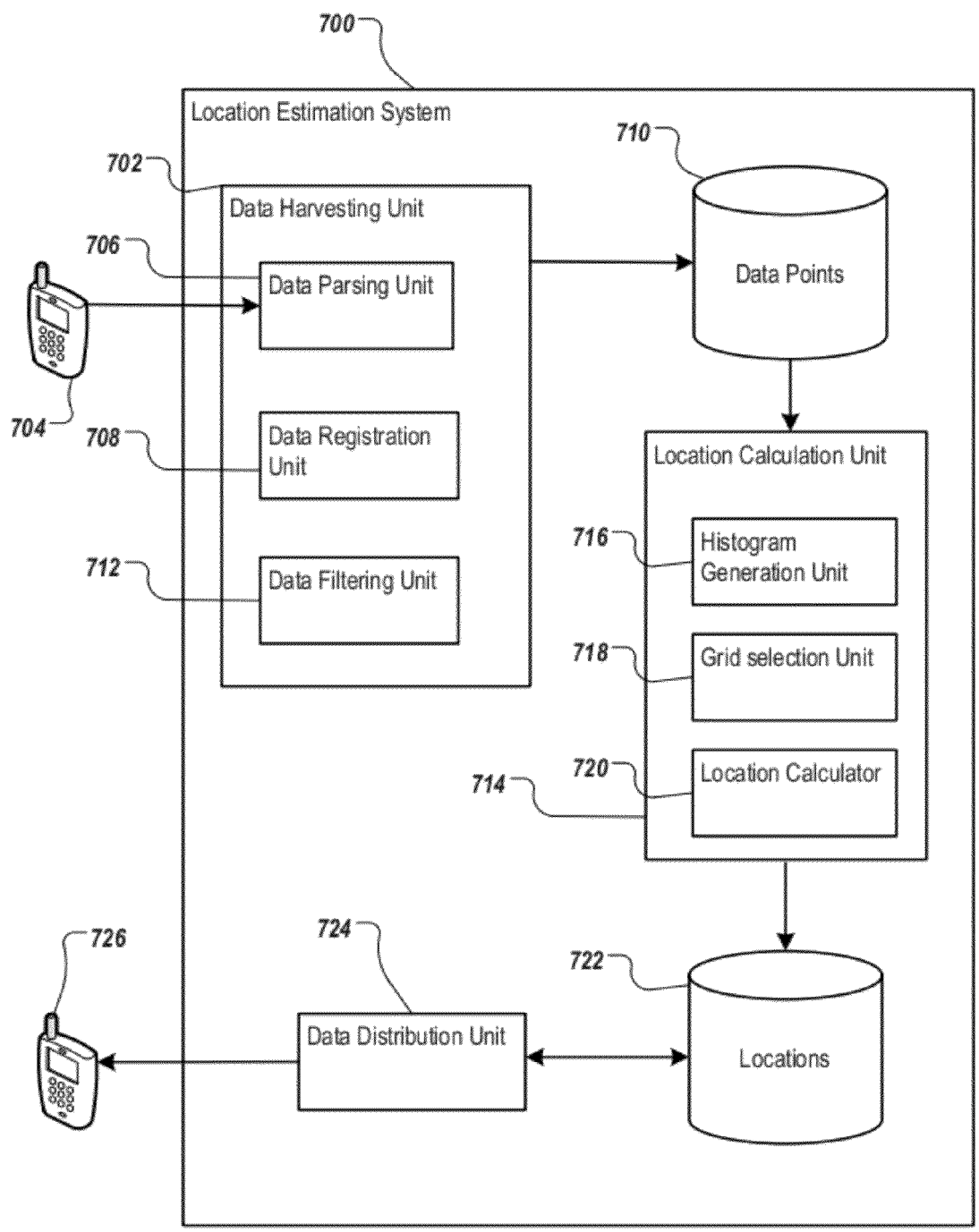
FIG. 7 is a block diagram illustrating various units of an exemplary system configured to perform location estimation using a probability density function.

FIG. 7 is a block diagram illustrating various units of an exemplary system configured to perform location estimation using a probability density function. Location estimation system 700 can include data harvesting unit 702. Data harvesting unit 702 is a component of location estimation system 700 that is programmed to receive and process data from one or more mobile devices 704. Data harvesting unit 702 can include data parsing unit 706. Data parsing unit 706 is a component of data harvesting unit 702 that is configured to receive the raw data from the one or more mobile devices 704, parse the data fields of the raw data, and generate structured data (e.g., name-value pairs). Further details of operations of data parsing unit 706 are described above in reference to stage 604 of FIG. 6.

Data harvesting unit 702 can include data registration unit 708. Data registration unit 708 is a component of data harvesting unit 702 that is configured to receive parsed data (e.g., name-value pairs) generated by data parsing unit 706, and send at least a portion of the parsed data to data point data store 710 for storage. Further details of operations of registration unit 708 are described above in reference to stage 606 of FIG. 6. Data point data store 710 can include a database (e.g., a relational database, an object-oriented database, or a flat file) that is configured to store location information in association with wireless access gateway identifiers.

Data harvesting unit 702 can include data filtering unit 712. Data filtering unit 712 is a component of data harvesting unit 702 that is configured to identify stale data from data point data store 710, and remove the stale data from data point data store 710. Further details of operations of filtering unit 712 are described above in reference to FIG. 5 and stage 608 of FIG. 6.

Location estimation system 700 can include location calculation unit 714. Location calculation unit 714 is a component of location estimation system 700 that is configured to generate one or more estimated locations based on data points stored in data point data store 710 using a probability density function. Location calculation unit 714 can include histogram generation unit 716. Histogram generation unit 716 is a component of location calculation unit 714 that is configured to generate a histogram (e.g., histogram 400 as described in reference to FIG. 4A) based on data points from data point data store 710. Histogram generation unit 716 can generate a histogram for each wireless access gateway.

Location calculation unit 714 can include grid selection unit 718. Grid selection unit 718 is a component of location calculation unit 714 that is configured to select one or more bins from the histogram generated by histogram generation unit 716 using a probability density function. The selection operations can include applying the probability function as described above in reference to FIG. 3B.

Location calculation unit 714 can include location calculator 720. Location calculator 720 is a component of location calculation unit 714 that is configured to calculate a location of each wireless access gateway based on the selected bins, and to calculate an uncertainty of the calculated location. The calculated location can include location coordinates including a latitude, a longitude, and an altitude. The uncertainty can indicate an estimated accuracy of the calculated location.

Location calculator 720 can be configured to calculate a reach of each wireless access from information associated with data points stored in data point data store 710. The reach of a wireless access gateway can indicate a maximum distance from which the wireless access gateway can be expected to be observed by a mobile device. Location calculator 720 can calculate the reach using locations in the harvested data and the calculated location.

Location calculation unit 714 can generate output including the location coordinates determined by location calculator 720. The location coordinates can be associated with an identifier of the wireless access gateway, an uncertainty, and a reach of the wireless access gateway. Location estimation system 700 can store the output in a location data store 722. Location data store 722 can be a database configured to store the location coordinates and associated information.

Location estimation system 700 can include data distribution unit 724. Data distribution 724 is a component of location estimation system 700 that is configured to retrieve the location coordinates and associated information stored in location data store 722 and send the location coordinates and associated information to one or more mobile devices 726. Mobile devices 726 can be the same mobile devices as mobile device 704, or separate and different mobile devices.

Exemplary Operations of Location Estimation

Figure 8A:
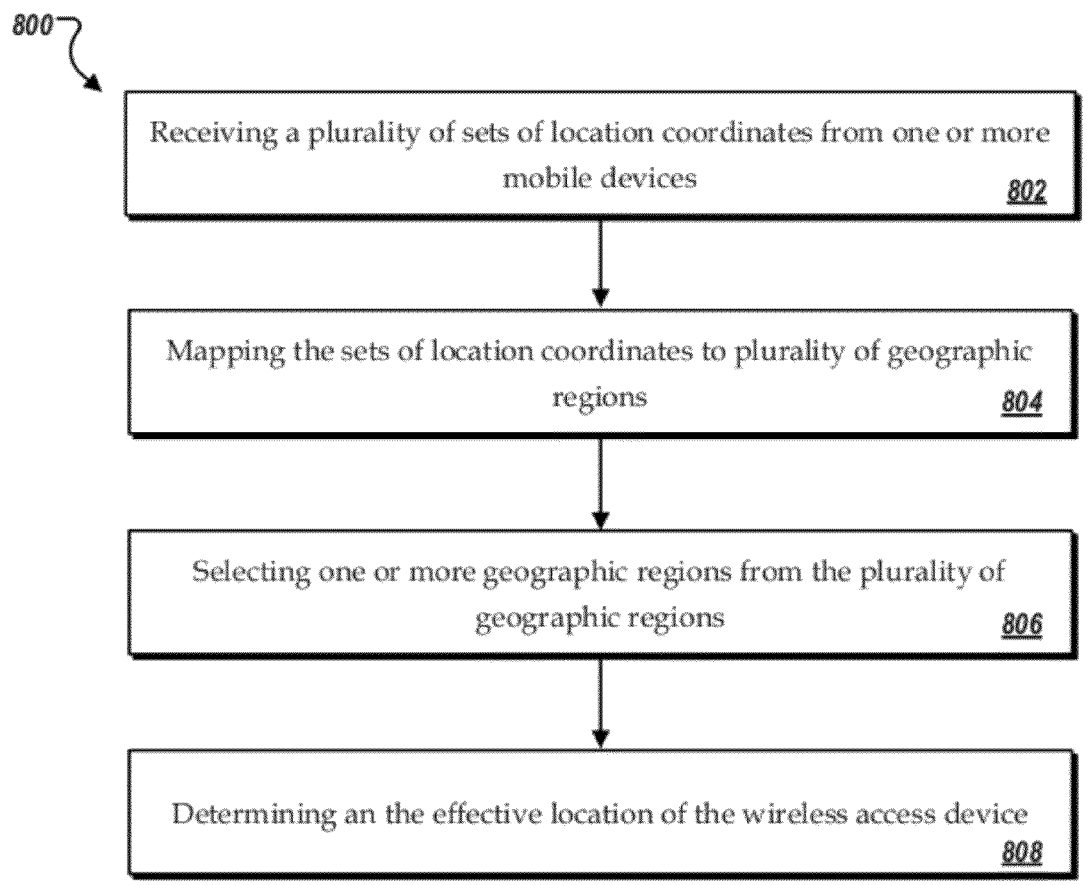
FIGS. 8A-8C are flowcharts illustrating exemplary operations of location estimation using a probability density function.
Figure 8B:
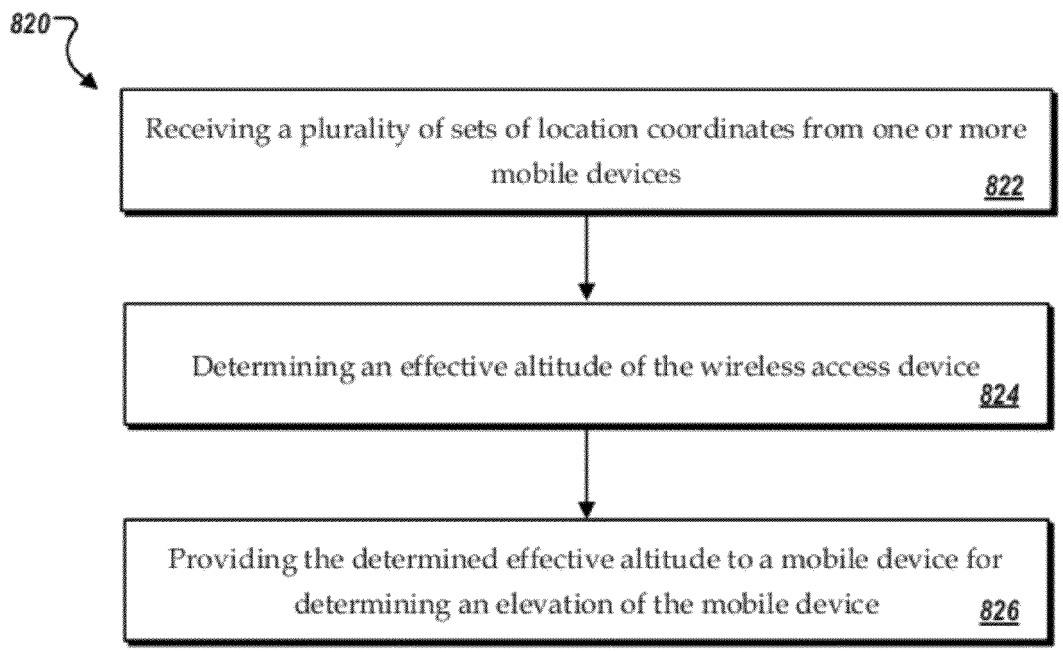
Figure 8C:
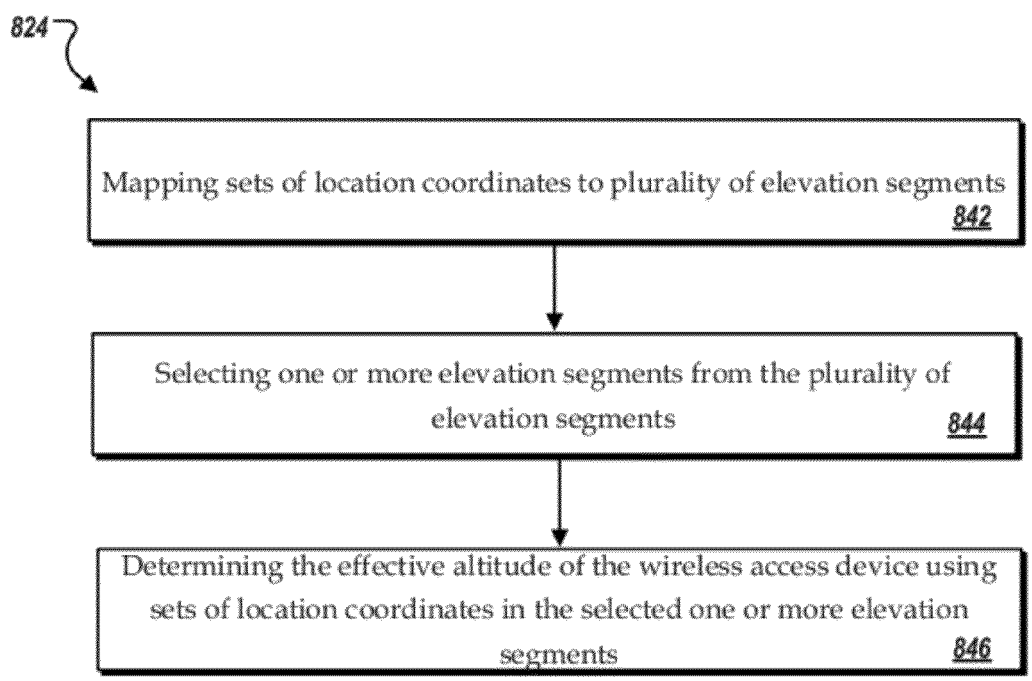

FIGS. 8A-8C are flowcharts illustrating exemplary operations 800 of location estimation using a probability density function. FIG. 8A is a flowchart illustrating exemplary operations of location estimation using a sufficient statistic of harvested data for calculating an effective location. Operations 800 of FIG. 8A can be performed by a system including hardware and software components (e.g., location estimation system 700 as described above in reference to FIG. 7).

The system can receive (802) multiple sets of location coordinates from one or more mobile devices. Each set of location coordinates can be associated with a wireless access gateway. Each set of location coordinates can include a latitude, a longitude, and an altitude. The altitude can be measured in meters or feet from sea level. The wireless access gateway can include a wireless device operable to connect a mobile device to at least one of a personal area network, a local area network, a metropolitan area network, a wide area network, or a cellular network. For example, the wireless access gateway can include an AP, a cell tower, or a Bluetooth™ device.

The system can map (804) the sets of location coordinates to multiple geographic regions. In some implementations, each geographic region can be a bin of a geographic grid comprising multiple bins. The geographic grid can be a geographic area associated with the wireless access gateway.

The system can select (806) one or more geographic regions from the multiple geographic regions. The selection can be based on a density of received location coordinates in each of the geographic regions. Selecting the one or more geographic regions can be based on a specified outlier threshold for identifying and excluding one or more outliers in the sets of location coordinates.

The system can perform the selection operations using a probability density function. The probability density function can include a sufficient statistic of the received set of location coordinates for calculating an effective location of the wireless access gateway. Selecting the one or more geographic regions can include, determining, for each geographic region and using the probability density function, an expected value based on a relative probability that a received set of location coordinates is located within the geographic region. The system can select the one or more geographic regions when a measurement of the expected value corresponding to the one or more geographic regions satisfies the outlier threshold. The measurement can be a sum or weighted sum. The system can determine that the measurement satisfies the outlier threshold when a sum or weighted sum of the corresponding expected values equals one minus the outlier threshold. Further details on operations of determining that the measurement satisfies the outlier threshold are described above in reference to FIG. 3B.

In some implementations, each set of the location coordinates is associated with a weight, the weight indicating a degree of certainty of the set of location coordinates. The expected value can be determined based on the relative probability and the weight. The system can determine the weight based on at least one of a received signal strength indication (RSSI) or a bit error rate associated with each data point. Applying the weights, the system can determine a k-th moment of the probability distribution based on the following formula:

In some implementations, the system can select one or more sets of location coordinates from the selected one or more geographic regions based on an estimated movement of the wireless access gateway. Determining the effective location of the wireless access gateway can include determining the effective location of the wireless access gateway using the selected sets of location coordinates. Selecting the one or more sets of location coordinates from the selected one or more geographic regions can include determining that at least one set of location coordinates is obsolete when a variation of sets of location coordinates exceeds a threshold. The variation of sets of location coordinates can exceed the threshold when the wireless access gateway has moved. The system can select the one or more sets of location coordinates by excluding the obsolete set of location coordinates.

To determine the variation, the system can utilize timestamps. Each set of location coordinates can have a timestamp corresponding to a time of measurement. Selecting the one or more sets of location coordinates can include excluding a collection of one or more sets of location coordinates in a geographic region when a span of the corresponding time of measurements of the sets in the collection satisfies a threshold time.

The system can determine (808) the effective location of the wireless access gateway using sets of location coordinates in the selected one or more geographic regions. The effective location can include a reach of the wireless access gateway and an estimated uncertainty of the wireless access gateway. The system can send the effective location to one or more mobile devices. A mobile device located within a communication range of the wireless access gateway can use the effective location to calculate a current location of the mobile device.

FIG. 8B is a flowchart illustrating exemplary operations 820 of altitude estimation based on statistics analysis. A system for determining an effective altitude of a wireless access gateway can receive (822) multiple sets of location coordinates from one or more mobile devices. Each set of location coordinates can be associated with a wireless access gateway. Each set of location coordinates can include an altitude.

The system can determine (824) an effective altitude of the wireless access gateway based on a statistical analysis using the received sets of location coordinates. Further details on determining the effective altitude of the wireless access gateway based on a statistical analysis will be described below in reference to FIG. 8C.

The system can provide (826) the determined effective altitude to a mobile device for determining an altitude of the mobile device when the mobile device is located within a communication range of the wireless access gateway.

FIG. 8C is a flowchart illustrating exemplary operations 824 of determine an effective altitude of the wireless access gateway based on a statistical analysis. A system can map (842) sets of location coordinates to multiple elevation segments.

The system can select (844) one or more elevation from the multiple elevation segments based on a density of received location coordinates in each of the elevation segments using a probability density function. The probability density function can include a sufficient statistic of the received sets of location coordinates for calculating the effective altitude. Selecting the one or more elevation segments can include determining, for each elevation segment and using the probability density function, an expected value based on a relative probability that a received set of location coordinates is located within the elevation segment. The system can select the one or more elevation segments when a measurement of the expected probability value corresponding to the one or more elevation segments satisfies an outlier threshold. The system can determine that the measurement satisfies the outlier threshold when a sum or weighted sum of the corresponding expected values equals one minus the outlier threshold.

In some implementations, the system can select one or more sets of location coordinates from the selected one or more elevation segments based on an estimated movement of the wireless access gateway. Determining the effective altitude of the wireless access gateway can include determining the effective altitude of the wireless access gateway using the selected sets of location coordinates. Selecting the one or more sets of location coordinates from the selected one or more elevation segments can include determining that at least one set of location coordinates is obsolete when a variation of sets of location coordinates exceeds a threshold. The variation of sets of location coordinates can exceed the threshold when the wireless access gateway has moved. The system can select the one or more sets of location coordinates by excluding the obsolete set of location coordinates.

To determine the variation, the system can utilize timestamps. Each set of location coordinates can have a timestamp corresponding to a time of measurement. Selecting the one or more sets of location coordinates can include excluding a collection, of one or more sets of location coordinates in a elevation segment when a span of the corresponding time of measurements of the sets in the collection satisfies a threshold time.

The system can determine (846) the effective altitude of the wireless access gateway using sets of location coordinates in the selected one or more elevation segments. The system can send the effective altitude of the wireless access gateway to one or more mobile devices for estimating an altitude of the mobile devices.

Exemplary User Interface

Figure 9:
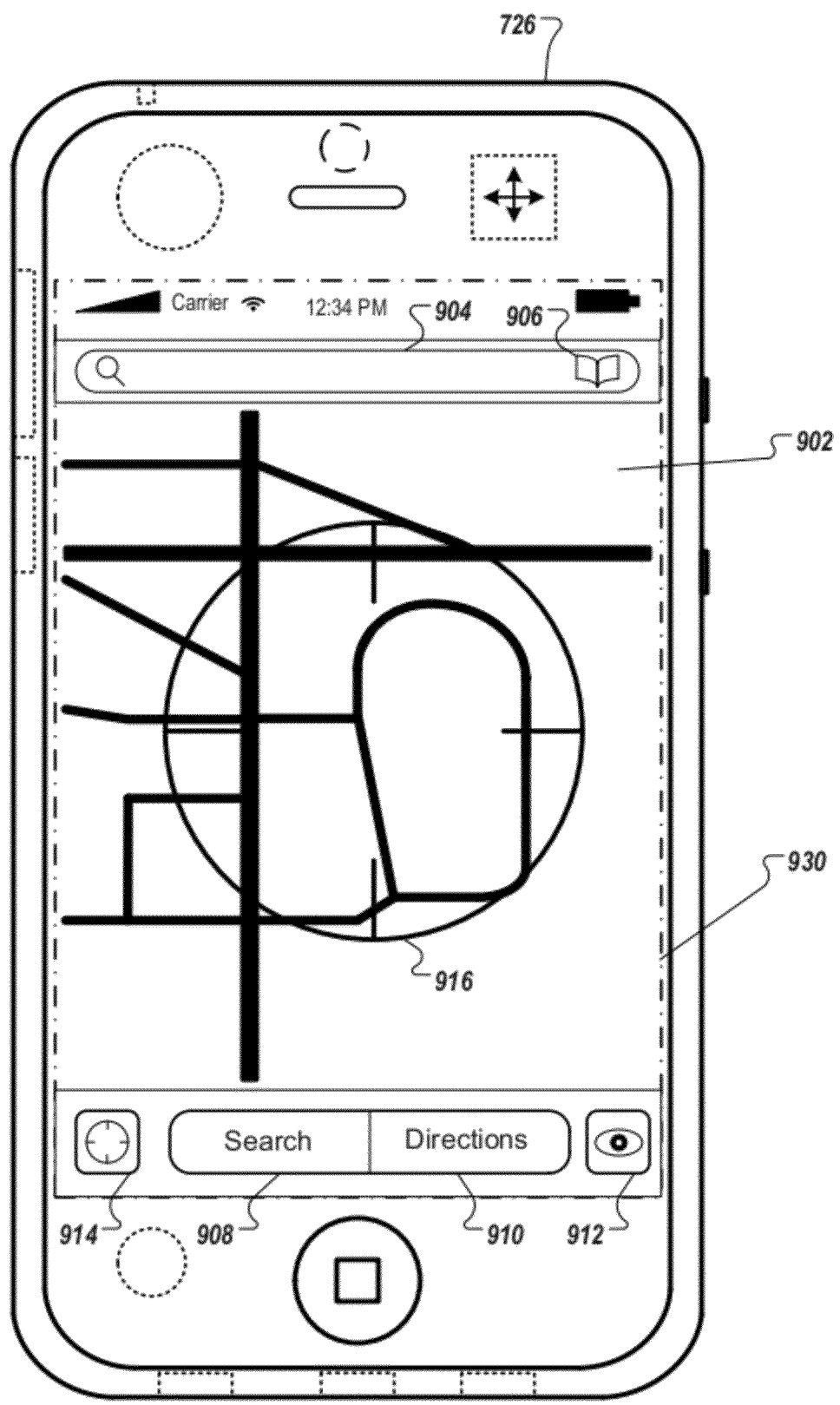
FIG. 9 is an exemplary user interface displaying an estimated location.

FIG. 9 is an exemplary user interface of a mobile device utilizing the estimated locations of a wireless access gateway. Mobile device 726 can include a touch-sensitive display device 930. Mobile device 726 can display map 902 of a geographic area on touch-sensitive display device 930.

The search bar 904 can be used to find an address or other location on the map. For example, a user can enter their home address in the search bar 904, and the region containing the address would be displayed on the map 902. The bookmarks list object 906 can, for example, bring up a Bookmarks list that contains addresses that are frequently visited, such as a user's home address. The Bookmarks list can also, for example, contain special bookmarks such as the current location (e.g. the current location of mobile device 726).

The search object 908 can be used to display the search bar 904 and other map related search menus. The directions object 910 can, for example, bring up a menu interface that allows the user to enter a start and end location. The interface can then display information (e.g., directions and travel time for a route from the start location to the end location). The map view object 912 can bring up a menu that will allow the user to select display options for the map 902. For example, the map 902 can be changed from black and white to color, the background of the map can be changed, or the user can change the brightness of the map.

The current location object 914 can allow the user to see a geographic area 916 on the map 902 indicating where mobile device 726 is currently located. Geographic area 916 can correspond to an estimated geographic location. The estimated location can be determined based on effective locations of wireless access gateways that are within communication range of mobile device 726. A special current location bookmark can be placed in the Bookmarks list when the current location object 914 is selected. If the special current location bookmark was previously set in the Bookmarks list, the old bookmark information can, for example, be replaced with the new current location information. In some implementations, the special current location bookmark is tied to the centroid of geographic area 916. That is, the special current location bookmark can include the coordinates for the centroid of the geographic area 916. The geographic area 916 can be based on location data determined or estimated using location instructions stored in a memory device of mobile device 726. The geographic area 916 can, for example, be depicted by a circle, rectangle, square, hexagon, or other enclosed region with crosshairs, or some other distinctive element to differentiate the geographic area 916 from the map 902.

Exemplary Mobile Device Architecture

Figure 10:
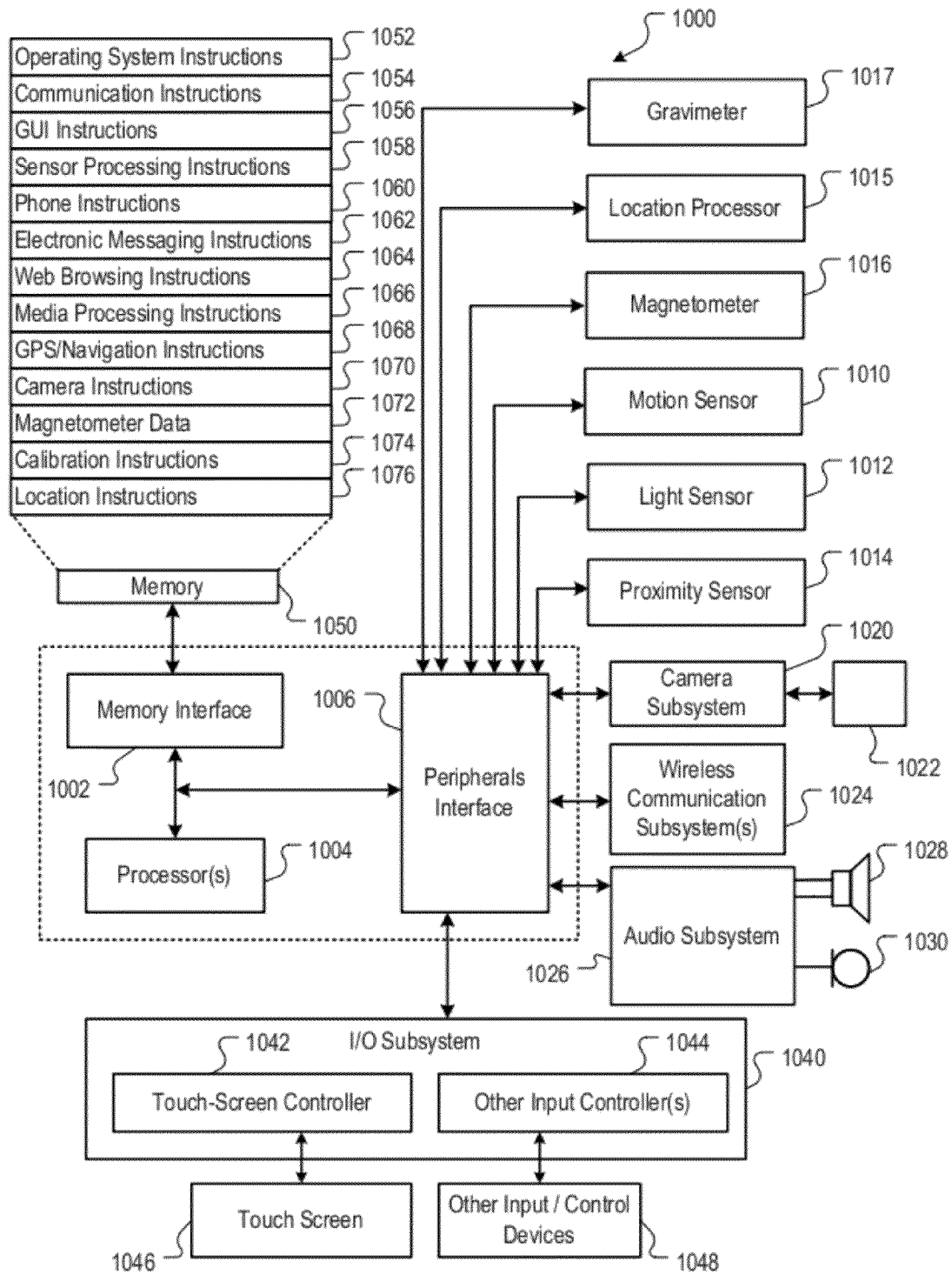
FIG. 10 is a block diagram illustrating an exemplary device architecture of a mobile device implementing the features and operations of location estimation.

FIG. 10 is a block diagram illustrating an exemplary device architecture 1000 of a mobile device implementing the features and operations of sending location data to a server and determining a current location using wireless access gateways. A mobile device can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. Processors 1004 can include one or more application processors (APs) and one or more baseband processors (BPs). The application processors and baseband processors can be integrated in one single process chip. The various components in mobile device 726, for example, can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Gravimeter 1017 can include one or more devices connected to peripherals interface 1106 and configured to measure a local gravitational field of Earth.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1024 designed to operate over a CDMA system, a WiFi™ or WiMax™ network, and a Bluetooth™ network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions.

I/O subsystem 1040 can include touch screen controller 1042 and/or other input controller(s) 1044. Touch-screen controller 1042 can be coupled to a touch screen 1046 or pad. Touch screen 1046 and touch screen controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1046.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch screen 1046; and a pressing of the button for a second duration that is longer than the first duration may turn power to mobile device 726 on or off. The user may be able to customize a functionality of one or more of the buttons. The touch screen 1046 can, for example, also be used to implement virtual or soft buttons and/or a keyboard.

In some implementations, mobile device 726 can present recorded audio and/or video files, such as MP3, AAC, and MPEG files. In some implementations, mobile device 726 can include the functionality of an MP3 player. Mobile device 726 may, therefore, include a pin connector that is compatible with the iPod. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; camera instructions 1070 to facilitate camera-related processes and functions; magnetometer data 1072 and calibration instructions 1074 to facilitate magnetometer calibration. The memory 1050 may also store other software instructions (not shown), such as security instructions, web video instructions to facilitate web video-related processes and functions, and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050. Memory 1050 can include location instructions 1076. Location instructions 1076 can be a computer program product that is configured to cause the mobile device to anonymously send a current location to a server.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

Exemplary System Architecture

Figure 11:
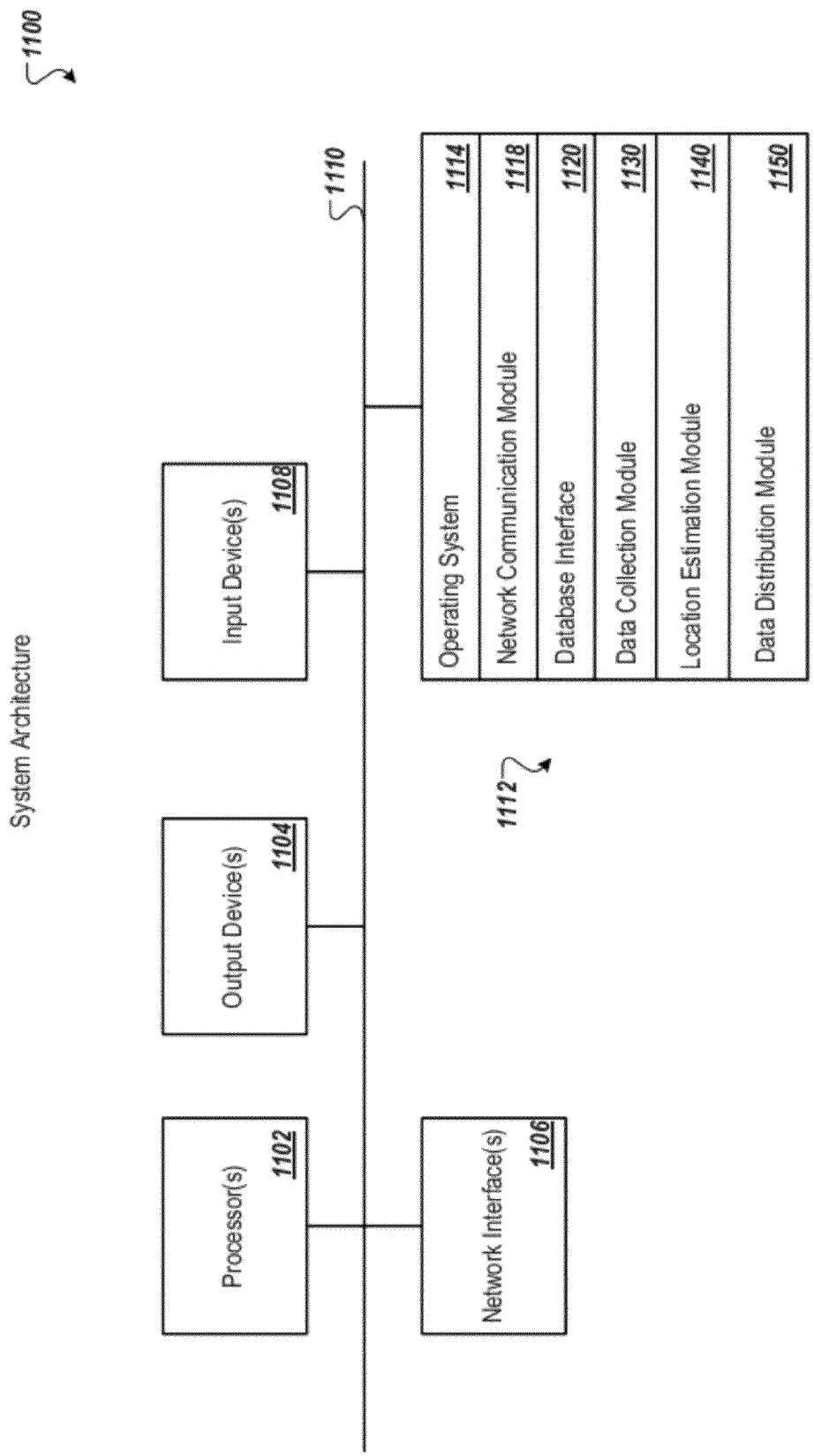
FIG. 11 is a block diagram of an exemplary system architecture for implementing the features and operations of location estimation.

FIG. 11 is a block diagram of an exemplary system architecture for implementing the features and operations location estimation based on a probability density function. Other architectures are possible, including architectures with more or fewer components. In some implementations, architecture 1100 includes one or more processors 1102 (e.g., dual-core Intel® Xeon® Processors), one or more output devices 1104 (e.g., LCD), one or more network interfaces 1106, one or more input devices 1108 (e.g., mouse, keyboard, touch-sensitive display) and one or more computer-readable mediums 1112 (e.g., RAM, ROM, SDRAM, hard disk, optical disk, flash memory, etc.). These components can exchange communications and data over one or more communication channels 1110 (e.g., buses), which can utilize various hardware and software for facilitating the transfer of data and control signals between components.

The term "computer-readable medium" refers to any medium that participates in providing instructions to processor 1102 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1112 can further include operating system 1114 (e.g., Mac OS® server, Windows® NT server), network communication module 1118, database interface 1120, data collection module 1130, location calculation module 1140, and data distribution module 1150. Database interface 1120 can provide functions for various data stores for storing location data. Data collection module 1130 can be configured to location coordinates and identifiers of wireless access gateways from mobile devices. Location estimation module 1140 can be configured to determine an effective location to be associated with each wireless access gateway. Data distribution module 1150 can be configured to distribute the effective location and associated identifiers of wireless access gateways to mobile devices. Operating system 1114 can be multi-user, multiprocessing, multitasking, multithreading, real time, etc. Operating system 1114 performs basic tasks, including but not limited to: recognizing input from and providing output to devices 1106, 1108; keeping track and managing files and directories on computer-readable mediums 1112 (e.g., memory or a storage device); controlling peripheral devices; and managing traffic on the one or more communication channels 1110. Network communications module 1118 includes various components for establishing and maintaining network connections (e.g., software for implementing communication protocols, such as TCP/IP, HTTP, etc.). Database interface 1120 can include interfaces to one or more databases on a file system. The databases can be organized under a hierarchical folder structure, the folders mapping to directories in the file system. Data collection module 1130 can include components for collecting data from multiple mobile devices.

Architecture 1100 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:

1. A method performed by one or more computers, comprising:
receiving a plurality of sets of location coordinates from one or more mobile devices, each set of location coordinates being associated with a wireless access gateway;
mapping the sets of location coordinates to a plurality of geographic regions;
selecting one or more geographic regions from the plurality of geographic regions, wherein selecting the one or more geographic regions comprises:
determining, for each geographic region and using a probability density function, an expected value based on a relative probability that a received set of location coordinates is located within the geographic region, the probability density function including a sufficient statistic of the received set of location coordinates for calculating an effective location of the wireless access gateway; and
selecting the one or more geographic regions upon determining that a measurement of the expected value corresponding to the one or more geographic regions satisfies an outlier threshold; and
determining the effective location of the wireless access gateway using sets of location coordinates in the selected one or more geographic regions.

2. The method of claim 1, wherein each set of location coordinates includes a latitude coordinate, a longitude coordinate, and an altitude coordinate.

3. The method of claim 1, wherein the wireless access gateway includes at least one of a cell tower, a wireless router, or a Bluetooth™ device.

4. The method of claim 1, wherein each geographic region is a bin of a geographic grid comprising multiple bins, the geographic grid being a geographic area associated with the wireless access gateway.

5. The method of claim 1, wherein each set of the location coordinates is associated with a weight, the weight indicating a degree of certainty of the set of location coordinates; and
determining the expected value includes determining the expected value based on the relative probability and the weight.

6. The method of claim 5, comprising determining the weight based on at least one of a received signal strength indication (RSSI) or a bit error rate.

7. The method of claim 1, comprising determining that the measurement satisfies the outlier threshold when a sum of the corresponding expected value equals one minus the outlier threshold.

8. The method of claim 1, comprising:
selecting one or more sets of location coordinates from the selected one or more geographic regions based on an estimated movement of the wireless access gateway, wherein determining the effective location of the wireless access gateway includes determining the effective location of the wireless access gateway using the selected sets of location coordinates.

9. The method of claim 8, wherein selecting one or more sets of location coordinates from the selected one or more geographic regions based on the estimated movement of the wireless access gateway comprises:
determining that at least one set of location coordinates is obsolete when a variation of sets of location coordinates exceeds a threshold, indicating that the wireless access gateway has moved; and
selecting the one or more sets of location coordinates by excluding the obsolete set of location coordinates.

10. The method of claim 8, wherein:
each set of location coordinates corresponds to a time of measurement; and
selecting the one or more sets of location coordinates comprises excluding a collection of one or more sets of location coordinates in a geographic region when a span of the corresponding time of measurements of the sets in the collection satisfies a threshold time.

11. The method of claim 1, comprising sending the effective location of the wireless access gateway to a mobile device located within a communication range of the wireless access gateway for determining a location of the mobile device.

12. A non-transitory medium storing a computer program product configured to cause one or more computers to perform operations comprising:
receiving a plurality of sets of location coordinates from one or more mobile devices, each set of location coordinates being associated with a wireless access gateway;
mapping the sets of location coordinates to a plurality of geographic regions;
selecting one or more geographic regions from the plurality of geographic regions based on a density of received location coordinates in each of the geographic regions represented using a probability density function, the probability density function including a sufficient statistic of the received set of location coordinates for calculating an effective location of the wireless access gateway;
selecting one or more sets of location coordinates from the selected one or more geographic regions based on an estimated movement of the wireless access gateway; and
determining the effective location of the wireless access gateway using the one or more sets of location coordinates.

13. The non-transitory medium of claim 12, wherein each set of location coordinates includes a latitude coordinate, a longitude coordinate, and an altitude coordinate.

14. The non-transitory medium of claim 12, wherein the wireless access gateway includes at least one of a cell tower, a wireless router, or a Bluetooth™ device.

15. The non-transitory medium of claim 12, wherein each geographic region is a bin of a geographic grid comprising multiple bins, the geographic grid being a geographic area associated with the wireless access gateway.

16. The non-transitory medium of claim 12, wherein selecting the one or more geographic regions comprises:
determining, for each geographic region and using the probability density function, an expected value based on a relative probability that a received set of location coordinates is located within the geographic region; and
selecting the one or more geographic regions when a measurement of the expected value corresponding to the one or more geographic regions satisfies an outlier threshold.

17. The non-transitory medium of claim 16, wherein
each set of the location coordinates is associated with a weight, the weight indicating a degree of certainty of the set of location coordinates; and
determining the expected value includes determining the expected value based on the relative probability and the weight.

18. The non-transitory medium of claim 17, the operations comprising determining the weight based on at least one of a received signal strength indication (RSSI) or a bit error rate.

19. The non-transitory medium of claim 16, the operations comprising determining that the measurement satisfies the outlier threshold when a sum of the corresponding expected value equals one minus the outlier threshold.

20. The product of claim 12, wherein selecting one or more sets of location coordinates from the selected one or more geographic regions based on the estimated movement of the wireless access gateway comprises:
determining that at least one set of location coordinates is obsolete when a variation of sets of location coordinates exceeds a threshold, indicating that the wireless access gateway has moved; and
selecting the one or more sets of location coordinates by excluding the obsolete set of location coordinates.

21. The product of claim 12, wherein:
each set of location coordinates corresponds to a time of measurement; and
selecting the one or more sets of location coordinates comprises excluding a collection of one or more sets of location coordinates in a geographic region when a span of the corresponding time of measurements of the sets in the collection satisfies a threshold time.

22. The product of claim 12, the operations comprising sending the effective location of the wireless access gateway to a mobile device located within a communication range of the wireless access gateway for determining a location of the mobile device.

23. A system, comprising:
one or more computers configured to perform operations comprising:
receiving a plurality of sets of location coordinates from one or more mobile devices, each set of location coordinates being associated with a wireless access gateway;
mapping the sets of location coordinates to a plurality of geographic regions;
selecting one or more geographic regions from the plurality of geographic regions based on:
a density of received location coordinates in each of the geographic regions represented using a probability density function, the probability density function including a sufficient statistic of the received set of location coordinates for calculating an effective location of the wireless access gateway
selecting one or more sets of location coordinates from the selected one or more geographic regions based on an estimated movement of the wireless access gateway; and determining the effective location of the wireless access gateway using the one or more sets of location coordinates.

24. The system of claim 23, wherein each set of location coordinates includes a latitude coordinate, a longitude coordinate, and an altitude coordinate.

25. The system of claim 23, wherein the wireless access gateway includes at least one of a cell tower, a wireless router, or a Bluetooth™ device.

26. The system of claim 23, wherein each geographic region is a bin of a geographic grid comprising multiple bins, the geographic grid being a geographic area associated with the wireless access gateway.

27. The system of claim 23, wherein selecting the one or more geographic regions comprises:
   determining, for each geographic region and using the probability density function, an expected value based on a relative probability that a received set of location coordinates is located within the geographic region; and
   selecting the one or more geographic regions when a measurement of the expected value corresponding to the one or more geographic regions satisfies an outlier threshold.

28. The system of claim 27, wherein
   each set of the location coordinates is associated with a weight, the weight indicating a degree of certainty of the set of location coordinates; and
   determining the expected value includes determining the expected value based on the relative probability and the weight.

29. The system of claim 28, the operations comprising determining the weight based on at least one of a received signal strength indication (RSSI) or a bit error rate.

30. The system of claim 27, the operations comprising determining that the measurement satisfies the outlier threshold when a sum of the corresponding expected value equals one minus the outlier threshold.

31. The system of claim 23, wherein selecting one or more sets of location coordinates from the selected one or more geographic regions based on the estimated movement of the wireless access gateway comprises:
   determining that at least one set of location coordinates is obsolete when a variation of sets of location coordinates exceeds a threshold, indicating that the wireless access gateway has moved; and
   selecting the one or more sets of location coordinates by excluding the obsolete set of location coordinates.

32. The system of claim 23, wherein:
   each set of location coordinates corresponds to a time of measurement; and
   selecting the one or more sets of location coordinates comprises excluding a collection of one or more sets of location coordinates in a geographic region when a span of the corresponding time of measurements of the sets in the collection satisfies a threshold time.

33. The system of claim 23, the operations comprising sending the effective location of the wireless access gateway to a mobile device located within a communication range of the wireless access gateway for determining a location of the mobile device.

* * * * *

UNITED STATES PATENT AND TRADEMARK OFFICE
CERTIFICATE OF CORRECTION

PATENT NO. : 8,903,414 B2  
APPLICATION NO. : 13/153069  
DATED : December 2, 2014  
INVENTOR(S) : Lukas M. Marti et al.

Page 1 of 1

It is certified that error appears in the above-identified patent and that said Letters Patent is hereby corrected as shown below:

Claims

Column 20, Line 63 (Claim 23), delete "gateway" and insert -- gateway; --, therefor.

Signed and Sealed this
Tenth Day of November, 2015

Michelle K. Lee
*Director of the United States Patent and Trademark Office*